(12) United States Patent
Hu et al.

(10) Patent No.: US 11,258,702 B2
(45) Date of Patent: Feb. 22, 2022

(54) ROUTING PATH ANALYSIS METHOD AND DEVICE

(71) Applicant: HUAWEI TECHNOLOGIES CO., LTD., Shenzhen (CN)

(72) Inventors: Pengwu Hu, Shenzhen (CN); Gang Ma, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 84 days.

(21) Appl. No.: 16/702,906

(22) Filed: Dec. 4, 2019

(65) Prior Publication Data

US 2020/0106701 A1  Apr. 2, 2020

Related U.S. Application Data

(63) Continuation of application No. PCT/CN2018/083574, filed on Apr. 18, 2018.

(30) Foreign Application Priority Data

Jun. 28, 2017 (CN) .......................... 201710510997.9

(51) Int. Cl.
| | | |
|---|---|---|
| *H04L 12/803* | (2013.01) | |
| *H04L 45/00* | (2022.01) | |
| *H04L 41/0213* | (2022.01) | |
| *H04L 45/02* | (2022.01) | |
| *H04L 45/12* | (2022.01) | |

(52) U.S. Cl.
CPC .......... *H04L 45/34* (2013.01); *H04L 41/0213* (2013.01); *H04L 45/02* (2013.01); *H04L 45/123* (2013.01)

(58) Field of Classification Search
None
See application file for complete search history.

(56) References Cited

U.S. PATENT DOCUMENTS

| | | | |
|---|---|---|---|
| 2014/0269266 A1 | 9/2014 | Filsfils et al. | |
| 2015/0103844 A1* | 4/2015 | Zhao | H04L 45/50 370/410 |
| 2016/0173366 A1 | 6/2016 | Saad et al. | |
| 2017/0373966 A1* | 12/2017 | Liao | H04L 45/507 |
| 2018/0131616 A1* | 5/2018 | LaBerge | H04L 47/125 |

FOREIGN PATENT DOCUMENTS

| | | |
|---|---|---|
| CN | 102035691 A | 4/2011 |
| CN | 105704019 A | 6/2016 |
| CN | 106161246 A | 11/2016 |

* cited by examiner

*Primary Examiner* — Jenkey Van
(74) *Attorney, Agent, or Firm* — Rimon PC

(57) ABSTRACT

The present disclosure discloses a routing path analysis method and device. The method includes a first step of determining a key node based on a label stack of segment routing of a data packet. The key node includes a diversion node, a next-hop working path node of the diversion node, and a next-hop protection path node of the diversion node. The diversion node is a crossed node of a working path and a protection path. The method further includes determining neighboring nodes of the key node as relevant nodes; querying for traffic information of the key node and traffic information of the relevant nodes; selecting, from the key node and the relevant nodes based on the traffic information, the nodes for the data packet to pass. The routing path of the data packet is determined based on the selected nodes.

12 Claims, 4 Drawing Sheets

ROUTING PATH ANALYSIS METHOD AND DEVICE

CROSS-REFERENCE TO RELATED APPLICATIONS

This application is a continuation of International Application No. PCT/CN2018/083574, filed on Apr. 18, 2018, which claims priority to Chinese Patent Application No. 201710510997.9, filed on Jun. 28, 2017. The disclosures of the aforementioned applications are hereby incorporated by reference in their entireties.

TECHNICAL FIELD

The present disclosure relates to the field of communications technologies, and in particular, to a routing path analysis method and device.

BACKGROUND

A basic feature of a segment routing (SR) technology is that a group of label stacks about how a data packet passes through key nodes are marked for the data packet in advance by a service entry (a first node), and when the data packet is transmitted through one of the key nodes, the node selects a transmission path in a network based on the label stacks carried in the data packet. The SR technology can protect stable transmission by setting a working path/a protection path. A general implementation of the SR technology can be described as following. An administrator presets a working path and a protection path. The first node in the work path may generate label stacks based on the working path for a data packet. The data packet is then sequentially transmitted through key nodes on the working path. However, if the working path is impassable through bidirectional forwarding detection (BFD), the first node regenerates label stacks by using the protection path preset by the administrator, and the data packet can be sequentially transmitted through key nodes based on the protection path.

Compared with a multiprotocol label switching (MPLS) technology and a native IP technology, the SR technology is simple and free to use, and also provides manageability. However, in actual routing, after a data packet is sent from a first node, a specific path of the data packet is out of control of the administrator. That is, the administrator does not know whether the packet is transmitted using the work path or protection path, and cannot learn of occurrences of loop, bypass, and the like on the actual transmitted path of the data packet.

This situation is caused by that the SR technology only specifies a key path, and that the key path is not equivalent to an actual path. Differences between the actual path and the key path defined by the administrator are expected. In some bad scenarios, the directions of the actual path and the key path may even be opposite. As a result, the administrator loses managerial control over how data packets are transmitted over a network. To make up for this loss of control, a traffic flow direction visualization technology may be used by network administrators to track transmission of data packets.

There are three types of commonly used traffic flow direction visualization technologies. One traffic flow direction visualization technology is a network-wide traffic collection technology. In this technology, data of network-wide traffic needs to be collected. Consequently, the technology takes up high network bandwidth, and router workload is also increased. In addition, because a network management server needs to analyze all packets reported by routers on the entire network, requirements on the CPU and the memory of the network management server are high, causing high costs of network management. Besides, due to an excessive amount of data processed by the routers and the server, the data processing period is long and the results cannot be obtained in real time. Moreover, if a router reports that no data packet is received, it cannot be determined whether the router is faulty or the router simply has no data packet.

A second traffic flow direction visualization technology is acquiring traffic at a key node based on an SR label. A third technology is obtaining a key node at a first node and then verifying, by using the BFD technology, whether the key node is selected. The shortcomings of these two technologies are that only the status of the key node can be obtained. The status of non-key nodes through which traffic actually passes cannot be obtained. Therefore, the status of the actual traffic path cannot be acquired.

SUMMARY

The embodiments of the present disclosure provide a routing path analysis method and device, to correctly determine the working path or the protection path that is actually selected for a data packet, and obtain more detailed routing path information, based on the traffic information of a key node and the traffic information of relevant nodes.

According to a first aspect, an embodiment of the present disclosure provides a routing path analysis method. The method includes:

determining a key node based on a label stack of segment routing of a data packet, where the key node includes a diversion node, a next-hop working path node of the diversion node, and a next-hop protection path node of the diversion node; and the diversion node is a crossed node of a working path and a protection path;

determining neighboring nodes of the key node as relevant nodes;

querying for traffic information of the key node and traffic information of the relevant nodes;

selecting, from the key node and the relevant nodes based on the traffic information, nodes through which the data packet passes; and determining a routing path based on the nodes through which the data packet passes.

It can be learned that in this embodiment of the present disclosure, based on the traffic information of the key node and the traffic information of the relevant nodes, a working path or a protection path to be selected for the data packet can be correctly determined, and more detailed routing path information can be obtained.

In an optional implementation, before determining the key node based on the label stack of segment routing of the data packet, the method further includes:

obtaining the label stack of the segment routing from a first node of the routing path.

It can be learned that in this embodiment of the present disclosure, the label stack of the segment routing can be obtained from the first node based on a feature of the segment routing.

In an optional implementation, before determining neighboring nodes of the key node as relevant nodes, the method further includes: obtaining the neighboring nodes of the key node based on a topological link between nodes.

It can be learned that in this embodiment of the present disclosure, the neighboring nodes of the key node can be obtained, and the traffic information of the neighboring node can also be obtained, to help obtain a more detailed routing path.

In an optional implementation, the method further includes:

obtaining a node label of the key node and node labels of the relevant nodes; and the querying of the traffic information of the key node and the traffic information of the relevant nodes includes:

querying for the traffic information of the key node and the traffic information of the relevant nodes by using the node labels.

It can be learned that in this embodiment of the present disclosure, the traffic information of the key node and the traffic information of the relevant nodes can be obtained.

In an optional implementation, the querying of the traffic information of the key node and the traffic information of the relevant nodes includes:

querying, based on the information about upstream nodes or downstream nodes of the key node and the information about use priorities of the upstream nodes or the downstream nodes that are included in the node label in the label stack, the traffic information of the key node and the traffic information of the relevant nodes.

It can be learned that in this embodiment of the present disclosure, the traffic information of the key node and the traffic information of the relevant nodes are determined based on the information about upstream nodes or downstream nodes of the key node and the information about use priorities of the upstream nodes or the downstream nodes that are included in the node label in the label stack.

In an optional implementation, after selecting from the key node and the relevant nodes based on the traffic information nodes through which the data packet passes, the method further includes:

determining, based on the shortest path first, an intermediate node between the nodes through which the data packet passes; and the determining of the routing path based on the nodes through which the data packet passes includes:

determining the routing path based on the nodes through which the data packet passes and the intermediate node.

It can be learned that in this embodiment of the present disclosure, the intermediate node between the key node and the relevant nodes through which the data packet passes may be determined through the shortest path first, and then the more detailed routing path are determined with reference to the traffic information of the three types of nodes.

In an optional implementation, the querying of the traffic information of the key node and the traffic information of the relevant nodes includes:

querying the traffic information of the key node and the traffic information of the relevant nodes by using the simple network management protocol (SNMP).

It can be learned that in this embodiment of the present disclosure, the SNMP protocol can be used to query traffic information of a small quantity of nodes without performing network-wide traffic detection.

According to a second aspect, an embodiment of the present disclosure provides a routing path analysis device. The device includes:

a first determining unit, configured to determine a key node based on a label stack of segment routing of a data packet, where the key node includes a diversion node, a next-hop working path node of the diversion node, and a next-hop protection path node of the diversion node; and the diversion node is a crossed node of a working path and a protection path;

a second determining unit, configured to determine neighboring nodes of the key node as relevant nodes;

a querying unit, configured to query for traffic information of the key node and traffic information of the relevant nodes;

a selection unit, configured to select, from the key node and the relevant nodes based on the traffic information, nodes through which the data packet passes; and a third determining unit, configured to determine a routing path based on the nodes through which the data packet passes.

In an optional implementation, the device further includes:

a first obtaining unit, configured to obtain the label stack of the segment routing from a first node of the routing path.

In an optional implementation, the device further includes:

a second obtaining unit, configured to obtain the neighboring nodes of the key node based on a topological link between nodes.

In an optional implementation, the device further includes:

a third obtaining unit, configured to obtain a node label of the key node and node labels of the relevant nodes, where the querying unit is configured to query the traffic information of the key node and the traffic information of the relevant nodes by using the node labels.

In an optional implementation, the querying unit is configured to query, based on the information about upstream nodes or downstream nodes of the key node and the information about use priorities of the upstream nodes or the downstream nodes that are included in the node label in the label stack, the traffic information of the key node and the traffic information of the relevant nodes.

In an optional implementation, the device further includes:

a fourth determining unit, configured to determine, based on the shortest path first, an intermediate node between the nodes through which the data packet passes, where the third determining unit is configured to determine the routing path based on the nodes through which the data packet passes and the intermediate node.

In an optional implementation, the querying unit is configured to query the traffic information of the key node and the traffic information of the relevant nodes by using the simple network management protocol (SNMP).

According to a third aspect, an embodiment of the present disclosure provides a network device, including a transceiver, a processor, and a memory, where the memory is configured to store a computer program; and the processor is configured to read the computer program stored in the memory, to perform the method described in the foregoing first aspect.

According to a fourth aspect, an embodiment of the present disclosure provides a computer-readable storage medium, where the computer-readable storage medium stores a computer program, and when the computer program is executed by a processor, the method described in the foregoing first aspect is implemented.

In the embodiments of the present disclosure, a key node is determined based on the label stack of segment routing of a data packet, where the key node includes a diversion node, a next-hop working path node of the diversion node, and a next-hop protection path node of the diversion node; and the diversion node is a crossed node of a working path and a protection path. Neighboring nodes of the key node are determined as relevant nodes, and the traffic information of the key node and the traffic information of the relevant nodes are queried. Nodes through which the data packet passes are selected from the key node and the relevant nodes based on the traffic information, and a routing path is determined based on the nodes through which the data packet passes. The embodiments of the present disclosure can correctly determine, based on the traffic information of the key node and the traffic information of the relevant nodes, a working path or a protection path that will be actually selected for the data packet and can obtain more detailed routing path information.

BRIEF DESCRIPTION OF DRAWINGS

To describe the technical solutions in the embodiments of the present disclosure more clearly, the following briefly describes the accompanying drawings for describing the embodiments of the present disclosure.

DESCRIPTION OF EMBODIMENTS

The following describes the embodiments of the present disclosure with reference to the accompanying drawings in the embodiments of the present disclosure.

Figure 1:
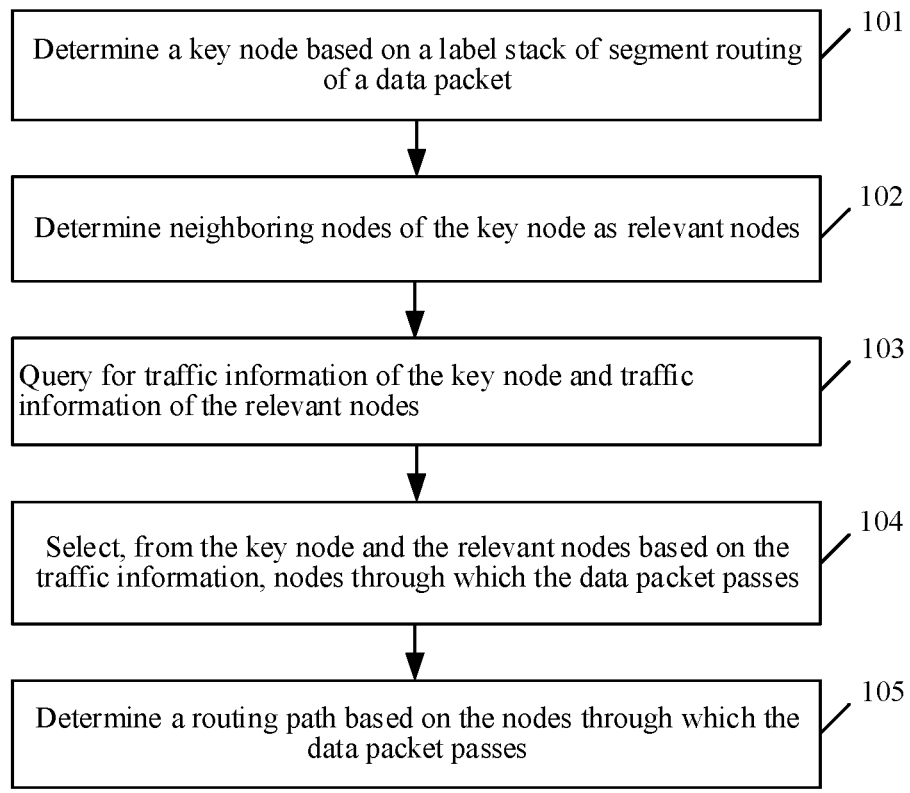
FIG. 1 is a schematic flowchart of a routing path analysis method according to an embodiment of the present disclosure.

FIG. 1 is a schematic flowchart of a routing path analysis method according to an embodiment of the present disclosure. As shown in FIG. 1, the routing path analysis method may include the following steps.

101. Determine a key node based on a label stack of segment routing of a data packet.

This embodiment of the present disclosure may be implemented by a network management server or a dedicated routing path analysis device. No limitation on a specific device is imposed in this embodiment of the present disclosure.

In this embodiment of the present disclosure, the key node includes a diversion node, a next-hop working path node of the diversion node, and a next-hop protection path node of the diversion node. A diversion node is a crossed node of a working path and a protection path.

Figure 2:
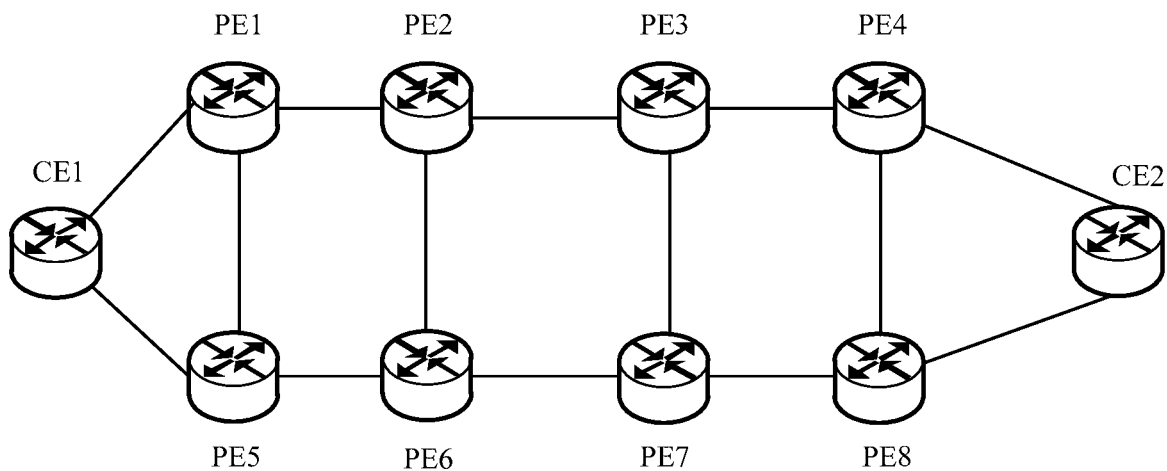
FIG. 2 is a schematic structural diagram of a router network according to an embodiment of the present disclosure.

FIG. 2 is a schematic structural diagram of a router network according to an embodiment of the present disclosure. As shown in FIG. 2, when a data packet is transmitted in the router network, a CE 1 is a first node, and a CE 2 is a target node. To be specific, the CE2 is a router node directly connected to a destination IP address of the data packet. According to a segment routing principle, an administrator predefines, at the first node CE 1, a label stack of a working path CE 1→PE 3→PE 4→CE 2, and predefines a label stack of a protection path CE 1→PE 3→PE 7→CE 2.

Based on the router network described in FIG. 2, a diversion node is the PE 3, a next-hop working path node of the diversion node is the PE 4, and a next-hop protection path node of the diversion node is the PE 7.

102. Determine neighboring nodes of the key node as relevant nodes.

In an optional implementation, the neighboring nodes of the key node may be obtained based on a topological link between router nodes, and the neighboring nodes may be determined as the relevant nodes.

Based on the router network described in FIG. 2, neighboring nodes of the key node PE 3 are the PE 2, the PE 4, and the PE 7, neighboring nodes of the key node PE 4 are the PE 3 and the PE 8, and neighboring nodes of the key node PE 7 are the PE 6, the PE 3, and the PE 8.

103. Query for traffic information of the key node and traffic information of the relevant nodes.

In an optional implementation, the traffic information of the key node and the traffic information of the relevant nodes are queried for based on a node label of the key node.

In an optional implementation, the traffic information of the key node and the traffic information of the relevant nodes may be queried for based on the node label of the key node by using the simple network management protocol (Simple Network Management Protocol, SNMP).

Based on the router network described in FIG. 2, the SNMP protocol may be used to query for traffic information of the PE 3, traffic information of the PE 2, traffic information of the PE 4, and traffic information of the PE 7 based on a node label of the PE 3 (that is, query for the traffic information of the key node PE 3 and the traffic information of the neighboring nodes of the key node PE 3), query for the traffic information of the PE 4, the traffic information of the PE 3, and traffic information of the PE 8 based on a node label of the PE 4, and query for the traffic information of the PE 7, traffic information of the PE 6, the traffic information of the PE 3, and the traffic information of the PE 8 based on a node label of the PE 7.

104. Select, from the key node and the relevant nodes based on the traffic information, nodes through which the data packet passes.

In this embodiment of the present disclosure, after the traffic information of the key node and the traffic information of the relevant nodes are queried for, a key node and relevant nodes through which the data packet actually passes may be determined based on the traffic information.

Based on the router network described in FIG. 2, when a device at the PE 2 is faulty, if the data packet is transmitted from the CE 1 to the CE 2, based on settings of the foregoing working path and protection path, after the traffic information of the key node and the traffic information of the relevant nodes are queried for, the key node and the relevant nodes through which the data packet passes and a sequence PE 7→PE 3→PE 4 of these nodes can be determined.

105. Determine a routing path based on the nodes through which the data packet passes.

In an optional implementation, an intermediate node through which the data packet passes when the data packet is transmitted between the key node and the relevant nodes may be determined in a shortest-path-first manner, so that a detailed routing path of the data packet is determined.

It can be learned that, by using the method described in FIG. 1, the network management server may query for the traffic information of the key node and the traffic information of the relevant nodes, and determine the detailed routing path of the data packet based on the traffic information of these nodes.

Figure 3:
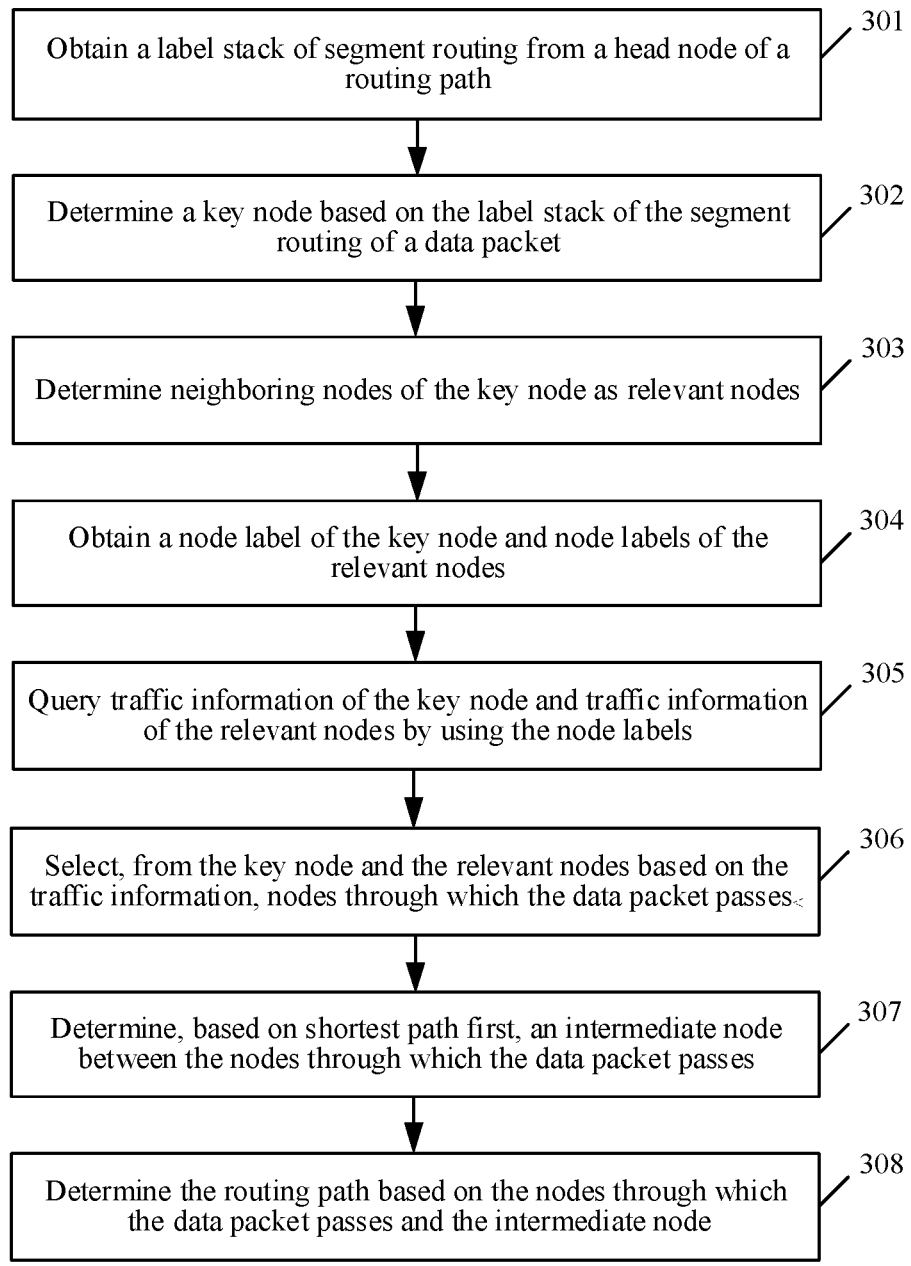
FIG. 3 is a schematic flowchart of another routing path analysis method according to an embodiment of the present disclosure.

FIG. 3 is a schematic flowchart of another routing path analysis method according to an embodiment of the present disclosure. As shown in FIG. 3, the routing path analysis method may include the following steps.

301. Obtain a label stack of segment routing from a first node of a routing path.

This embodiment of the present disclosure may be implemented by a network management server or a dedicated routing path analysis device. No limitation on specific device is imposed in this embodiment of the present disclosure.

Based on a feature of the segment routing, an administrator sets, at the first node of the routing path, the label stack used to indicate a working path and a protection path. Therefore, the network management server can obtain the label stack of the segment routing from the first node of the routing path.

302. Determine a key node based on the label stack of the segment routing of a data packet.

In this embodiment of the present disclosure, the key node includes a diversion node, a next-hop working path node of the diversion node, and a next-hop protection path node of the diversion node. A diversion node is a crossed node of a working path and a protection path.

FIG. 2 is a schematic structural diagram of a router network according to an embodiment of the present disclosure. As shown in FIG. 2, when the data packet is transmitted in the router network, a CE 1 is a first node, and a CE 2 is a target node. To be specific, the CE 2 is a router node directly connected to a destination IP address of the data packet. According to a segment routing principle, an administrator predefines, at the first node CE 1, a label stack of a working path CE 1→PE 3→PE 4→CE 2, and predefines a label stack of a protection path CE 1→PE 3→PE 7→CE 2.

Based on the router network described in FIG. 2, a diversion node is the PE 3, a next-hop working path node of the diversion node is the PE 4, and a next-hop protection path node of the diversion node is the PE 7.

303. Determine neighboring nodes of the key node as relevant nodes.

In an optional implementation, the neighboring nodes of the key node may be obtained based on a topological link between router nodes, and the neighboring nodes may be determined as the relevant nodes.

Based on the router network described in FIG. 2, neighboring nodes of the key node PE 3 are the PE 2, the PE 4, and the PE 7, neighboring nodes of the key node PE 4 are the PE 3 and the PE 8, and neighboring nodes of the key node PE 7 are the PE 6, the PE 3, and the PE 8.

304. Obtain a node label of the key node and node labels of the relevant nodes.

305. Query for traffic information of the key node and traffic information of the relevant nodes by using the node labels.

In an optional implementation, the traffic information of the key node and the traffic information of the relevant nodes may be queried for based on the node label of the key node by using the simple network management protocol (SNMP).

In this embodiment of the present disclosure, the node label of the key node includes information about upstream nodes or downstream nodes of the key node and information about use priorities of the upstream nodes or the downstream nodes, and traffic information of the key node and traffic information of the relevant nodes may be queried for based on the information about the upstream nodes or the downstream nodes and the information about the use priorities of the upstream nodes or the downstream nodes.

Based on the router network described in FIG. 2, the SNMP protocol may be used to query for traffic information of the PE 3, traffic information of the PE 2, traffic information of the PE 4, and traffic information of the PE 7 based on a node label of the PE 3 (that is, query for the traffic information of the key node PE 3 and the traffic information of the neighboring nodes of the key node PE 3), to query for the traffic information of the PE 4, the traffic information of the PE 3, and traffic information of the PE 8 based on a node label of the PE 4, and to query for the traffic information of the PE 7, traffic information of the PE 6, the traffic information of the PE 3, and the traffic information of the PE 8 based on a node label of the PE 7.

306. Select, from the key node and the relevant nodes based on the traffic information, nodes through which the data packet passes.

In this embodiment of the present disclosure, after the traffic information of the key node and the traffic information of the relevant nodes are queried for, a key node and relevant nodes through which the data packet actually passes may be determined based on the traffic information.

Based on the router network described in FIG. 2, when a device at the PE 2 is faulty, if the data packet is transmitted from the CE 1 to the CE 2, based on settings of the foregoing working path and protection path, after the traffic information of the key node and the traffic information of the relevant nodes are queried for, the key node and the relevant nodes through which the data packet passes and a sequence PE 7→PE 3→PE 4 of these nodes can be determined.

307. Determine, based on the shortest path first manner, an intermediate node between the nodes through which the data packet passes.

In an optional implementation, the intermediate node through which the data packet passes when the data packet is transmitted between the key node and the relevant nodes may be determined in the shortest path first manner, so that a detailed routing path of the data packet is determined.

308. Determine the routing path based on the nodes through which the data packet passes and the intermediate node.

It can be learned that, by using the method described in FIG. 3, the network management server can query for the traffic information of the key node and the traffic information of the relevant nodes, and determine the detailed routing path of the data packet based on the traffic information of these nodes.

Figure 4:
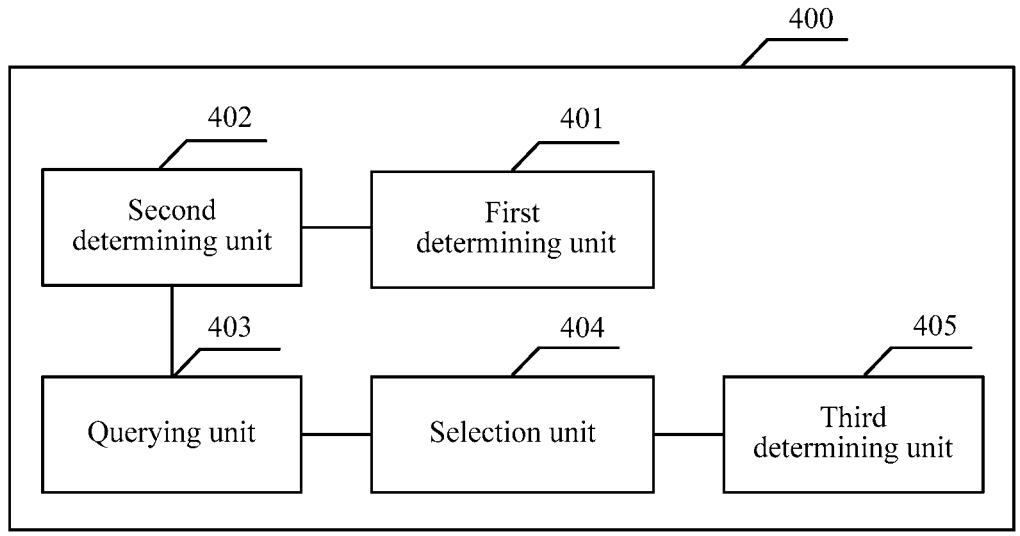
FIG. 4 is a schematic structural diagram of a routing path analysis device according to an embodiment of the present disclosure.

FIG. 4 is a schematic structural diagram of a routing path analysis device 400 according to an embodiment of the present disclosure. As shown in FIG. 4, the routing path analysis device may include a first determining unit 401, a second determining unit 402, a querying unit 403, a selection unit 404, and a third determining unit 405.

The first determining unit 401 is configured to determine a key node based on a label stack of segment routing of a data packet.

In this embodiment of the present disclosure, the key node includes a diversion node, a next-hop working path node of the diversion node, and a next-hop protection path node of the diversion node, and the diversion node is a crossed node of a working path and a protection path; and the diversion node is a crossed node of a working path and a protection path.

FIG. 2 is a schematic structural diagram of a router network according to an embodiment of the present disclosure. As shown in FIG. 2, when the data packet is transmitted in the router network, a CE 1 is a first node, and a CE 2 is a target node, to be specific, the CE 2 is a router node directly connected to a destination IP address of the data packet. According to a segment routing principle, an administrator predefines, at the first node CE1, a label stack of a working path CE 1→PE 3→PE 4→CE 2, and predefines a label stack of a protection path CE 1→PE 3→PE 7→CE 2.

Based on the router network described in FIG. 2, a diversion node is the PE 3, a next-hop working path node of the diversion node is the PE 4, and a next-hop protection path node of the diversion node is the PE 7.

The second determining unit 402 is configured to determine neighboring nodes of the key node as relevant nodes.

In an optional implementation, the neighboring nodes of the key node may be obtained based on a topological link between router nodes, and the neighboring nodes may be determined as the relevant nodes.

Based on the router network described in FIG. 2, neighboring nodes of the key node PE 3 are the PE 2, the PE 4, and the PE 7, neighboring nodes of the key node PE 4 are the PE 3 and the PE 8, and neighboring nodes of the key node PE 7 are the PE 6, the PE 3, and the PE 8.

The querying unit 403 is configured to query for traffic information of the key node and traffic information of the relevant nodes.

In an optional implementation, the traffic information of the key node and the traffic information of the relevant nodes are queried for based on a node label of the key node.

In an optional implementation, the traffic information of the key node and the traffic information of the relevant nodes may be queried for based on the node label of the key node by using the simple network management protocol (SNMP).

Based on the router network described in FIG. 2, the SNMP protocol may be used to query for traffic information of the PE 3, traffic information of the PE 2, traffic information of the PE 4, and traffic information of the PE 7 based on a node label of the PE 3 (that is, query for the traffic information of the key node PE 3 and the traffic information of the neighboring nodes of the key node PE 3), to query for the traffic information of the PE 4, the traffic information of PE 3, and traffic information of PE 8 based on a node label of the PE 4, and to query for the traffic information of the PE 7, traffic information of the PE 6, the traffic information of the PE 3, and the traffic information of the PE 8 based on a node label of the PE 7.

The selection unit 404 is configured to select, from the key node and the relevant nodes based on the traffic information, nodes through which the data packet passes.

In this embodiment of the present disclosure, after the traffic information of the key node and the traffic information of the relevant nodes are queried for, a key node and relevant nodes through which the data packet actually passes may be determined based on the traffic information.

Based on the router network described in FIG. 2, when a device at the PE 2 is faulty, if the data packet is transmitted from the CE 1 to the CE 2, based on settings of the foregoing working path and protection path, after the traffic information of the key node and the traffic information of the relevant nodes are queried for, the key node and the relevant nodes through which the data packet passes and a sequence PE 7→PE 3→PE 4 of these nodes can be determined.

The third determining unit 405 is configured to determine a routing path based on the nodes through which the data packet passes.

In an optional implementation, an intermediate node through which the data packet passes when the data packet is transmitted between the key node and the relevant nodes may be determined in a shortest path first manner, so that a detailed routing path of the data packet is determined.

It can be learned that, when the routing path analysis device described in FIG. 4 is used, the traffic information of the key node and the traffic information of the relevant nodes can be queried for, and the detailed path of the routing of the data packet can be determined based on the traffic information of these nodes.

Figure 5:
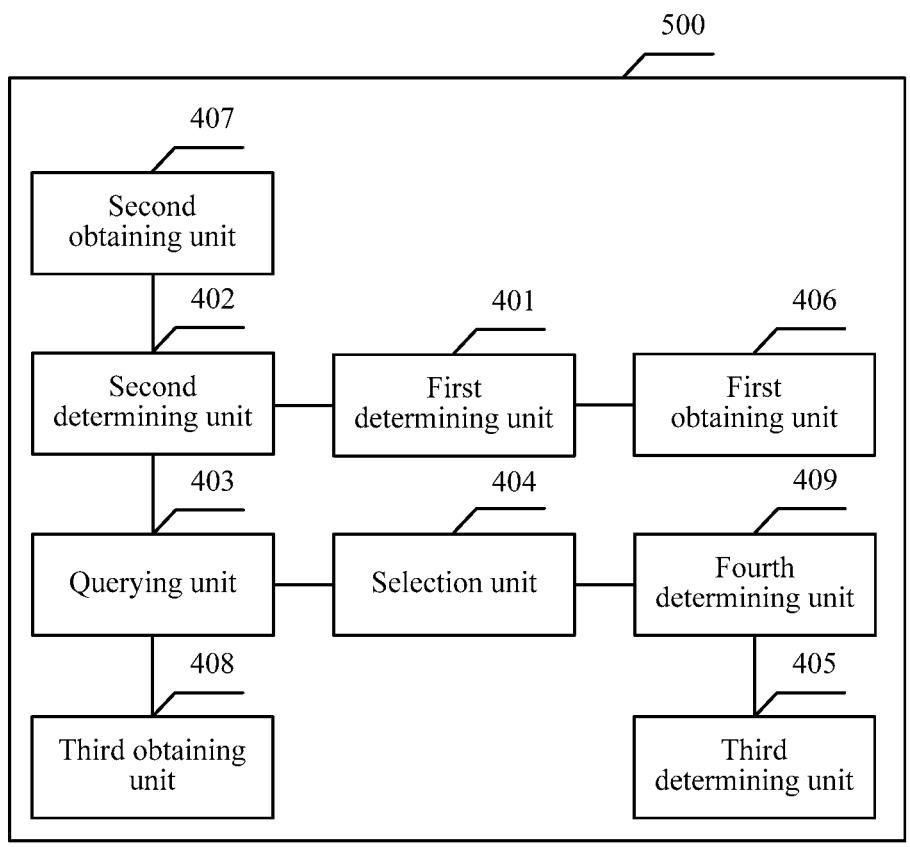
FIG. 5 is a schematic structural diagram of another routing path analysis device according to an embodiment of the present disclosure.

FIG. 5 is a schematic structural diagram of another routing path analysis device 500 according to an embodiment of the present disclosure. The routing path analysis device 500 described in FIG. 5 is obtained based on the routing path analysis device described in FIG. 4. Compared with the device described in FIG. 4, the device described in FIG. 5 further includes a first obtaining unit 406, a second obtaining unit 407, a third obtaining unit 408, and a fourth determining unit 409.

The first obtaining unit 406 is configured to obtain a label stack of a segment routing from a first node of a routing path.

Based on a feature of the segment routing, an administrator sets, at the first node of the routing path, the label stack used to indicate a working path and a protection path. Therefore, the network management server can obtain the label stack of the segment routing from the first node of the routing path.

The second obtaining unit 407 is configured to obtain neighboring nodes of a key node based on a topological link between nodes.

The third obtaining unit 408 is configured to obtain a node label of the key node and node labels of the relevant nodes.

In an optional implementation, the routing path analysis device 500 may further include:

a fourth determining unit 409, configured to determine, based on shortest path first, an intermediate node between the nodes through which the data packet passes, where the third determining unit 405 is specifically configured to determine the routing path based on the nodes through which the data packet passes and the intermediate node.

It is noted that in the present disclosure, term "unit" may be used to refer to one or more processors or circuits that are programed to perform certain functions or methods. It can be learned that when the routing path analysis device described in FIG. 5 is used, the traffic information of the key node and the traffic information of the relevant nodes can be queried for, and a detailed routing path of the data packet can be determined based on the traffic information of these nodes.

Figure 6:
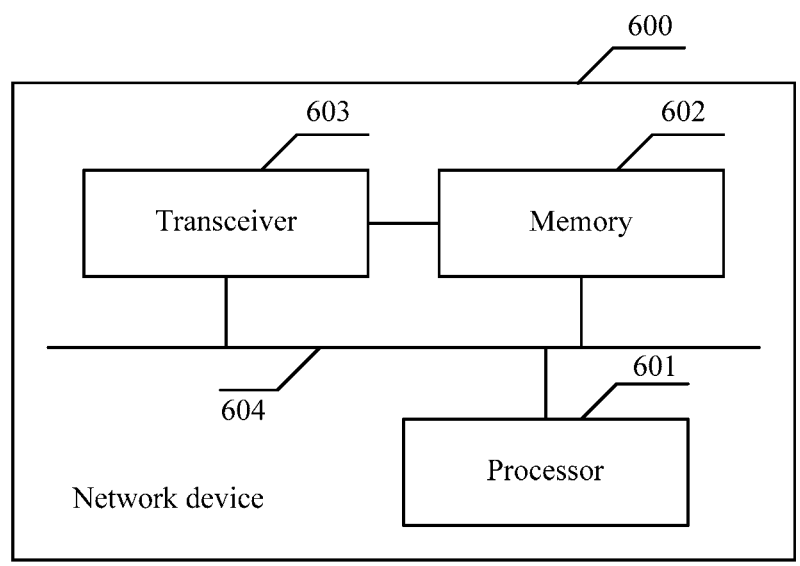
FIG. 6 is a schematic structural diagram of a network device according to an embodiment of the present disclosure.

FIG. 6 is a network device 600 according to an embodiment of the present disclosure. The network device includes a processor 601, a memory 602, a transceiver 603, and a bus 604. The processor 601, the memory 602, and the transceiver 603 are connected to each other via the bus 604.

The memory 602 includes but is not limited to a random access memory (RAM), a read-only memory (ROM), an erasable programmable read only memory (EPROM), or a portable compact disc read-only memory (CD-ROM). The memory 602 is configured to store a relevant instruction and relevant data. The transceiver 603 is configured to send and receive data.

It should be understood that, the processor 601 in this embodiment of the present disclosure may be a central processing unit (CPU), or may further be another general purpose processor, a digital signal processor (DSP), an application-specific integrated circuit (ASIC), a field-programmable gate array (FPGA), or another programmable logical device, discrete gate or transistor logical device, discrete hardware component, or the like. The general purpose processor may be a microprocessor, or the processor may be any conventional processor or the like.

The processor 601 in the network device is configured to read program code stored in the memory 602, to perform the following operations:

determining a key node based on a label stack of segment routing of a data packet, where the key node includes a diversion node, a next-hop working path node of the diversion node, and a next-hop protection path node of the diversion node, and where the diversion node is a crossed node of a working path and a protection path;

determining neighboring nodes of the key node as relevant nodes;

querying for traffic information of the key node and traffic information of the relevant nodes;

selecting, from the key node and the relevant nodes based on the traffic information, nodes through which the data packet passes; and determining a routing path based on the selected.

During specific implementation, the processor 601 and the transceiver 603 described in this embodiment of the present disclosure may perform the implementation described in any of the foregoing embodiments of the routing path analysis method provided in the embodiments of the present disclosure, or may perform the implementation of the network device described in this embodiment of the present disclosure. Details are not described herein again.

In another embodiment of the present disclosure, a computer-readable storage medium is provided. The computer-readable storage medium may be transitory or non-transitory. The computer-readable storage medium stores a computer program. When the computer program is executed by a processor, the steps of the method described in any one of the foregoing embodiments are implemented.

The computer-readable storage medium may be an internal storage unit of the network device in any one of the foregoing embodiments, for example, a hard disk or a memory of the network device. The computer-readable storage medium may alternatively be an external storage device of the network device, for example, a plug-connected hard disk, a smart storage card (SMC), a secure digital (SD) card, a flash card, or the like that is provided on the network device. Further, the computer-readable storage medium may alternatively include both the internal storage unit and the external storage device of the network device. The computer-readable storage medium is configured to store the computer program and other programs and data that are used by the network device. The computer-readable storage medium may be further configured to temporarily store data that is already output or that is to be output.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to the prior art, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the foregoing embodiments may be implemented by a program instructing relevant hardware. The program may be stored in a computer-readable storage medium. The storage medium may include a flash memory, a read-only memory (ROM), a random access memory (RAM), a magnetic disk, and an optical disc.

The embodiments of the present disclosure are described in detail above. The principle and implementation of the present disclosure are described in the specification through specific examples. The description about the embodiments is merely provided to help understand the method and core ideas of the present disclosure. In addition, a person of ordinary skill in the art can make changes to the present disclosure in terms of the specific implementations and application scopes according to the ideas of the present disclosure. Therefore, content of the specification shall not be construed as a limit to the present disclosure.

What is claimed is:

1. A routing path analysis method, comprising:
determining a key node based on a label stack of segment routing of a data packet, wherein the key node is one of the following: a diversion node, a next-hop working path node of the diversion node, and a next-hop protection path node of the diversion node, and wherein the diversion node is a crossed node of a working path and a protection path;
determining neighboring nodes of the key node as relevant nodes;
obtaining a node label of the key node and node labels of the relevant nodes;
querying for traffic information of the key node and traffic information of the relevant nodes;
selecting, from the key node and the relevant nodes based on the traffic information, nodes through which the data packet passes; and
determining a routing path based on the selected nodes;
wherein the querying of traffic information of the key node and traffic information of the relevant nodes comprises:
querying, based on information about upstream nodes or downstream nodes and information about use priorities of the upstream nodes or the downstream nodes that are included in the node label in the label stack, for the traffic information of the key node and the traffic information of the relevant nodes.

2. The method according to claim 1, wherein the method further comprises:
obtaining a label stack of segment routing of the routing path from a first node of the routing path.

3. The method according to claim 1, wherein the method further comprises:
obtaining the neighboring nodes of the key node based on a topological link between nodes.

4. The method according to claim 1, wherein after selecting, from the key node and the relevant nodes based on the traffic information, nodes for the data packet to pass, the method further comprises:
determining, an intermediate node between the selected nodes; and
the determining of a routing path based on the selected nodes comprises:
determining the routing path based on the selected nodes and the intermediate node.

5. The method according to claim 1, wherein the querying for traffic information of the key node and traffic information of the relevant nodes comprises:
querying for the traffic information of the key node and the traffic information of the relevant nodes by using the simple network management protocol (SNMP).

6. A routing path analysis device, comprising:
at least one processor;
a storage medium coupled to the at least one processor and storing programming instructions for execution by the at least one processor, wherein the programming instructions instruct the at least one processor to:
determine a key node based on a label stack of segment routing of a data packet, wherein the key node comprises one of a diversion node, a next-hop working path node of the diversion node, and a next-hop protection path node of the diversion node, and wherein the diversion node is a crossed node of a working path and a protection path;
determine neighboring nodes of the key node as relevant nodes;
obtain a node label of the key node and node labels of the relevant nodes;
query for traffic information of the key node and traffic information of the relevant nodes;
select, from the key node and the relevant nodes based on the traffic information, nodes through which the data packet passes; and
determine a routing path based on the selected nodes;
wherein the querying of traffic information of the key node and traffic information of the relevant nodes comprises:
querying, based on information about upstream nodes or downstream nodes and information about use priorities of the upstream nodes or the downstream nodes that are included in the node label in the label stack, for the traffic information of the key node and the traffic information of the relevant nodes.

7. The device according to claim 6, wherein the programming instructions further instruct the at least one processor to:
obtain a label stack of segment routing of the routing path from a first node of the routing path.

8. The device according to claim 6, wherein the programming instructions further instruct the at least one processor to:
obtain the neighboring nodes of the key node based on a topological link between nodes.

9. The device according to claim 6, wherein the programming instructions further instruct the at least one processor to:
determine an intermediate node between the nodes through which the data packet passes;
determine the routing path based on the nodes through which the data packet passes and the intermediate node.

10. The device according to claim 6, wherein the programming instructions further instruct the at least one processor to query for the traffic information of the key node and the traffic information of the relevant nodes by using the simple network management protocol (SNMP).

11. A network device, comprising a transceiver, a processor, and a memory, wherein
the memory is configured to store a computer program; and
the processor is configured to read the computer program stored in the memory to perform the method according to claim 1.

12. A non-transitory computer-readable storage medium, wherein the computer-readable storage medium stores a computer program that, when executed by a processor, implements a method comprising:
determining a key node based on a label stack of segment routing of a data packet, wherein the key node comprises one of a diversion node, a next-hop working path node of the diversion node, and a next-hop protection path node of the diversion node, wherein the diversion node is a crossed node of a working path and a protection path;
determining neighboring nodes of the key node as relevant nodes;
obtaining a node label of the key node and node labels of the relevant nodes;
querying for traffic information of the key node and traffic information of the relevant nodes;
selecting, from the key node and the relevant nodes based on the traffic information, nodes through which the data packet passes; and
determining a routing path based on the selected nodes;

wherein the querying of traffic information of the key node and traffic information of the relevant nodes comprises:

querying, based on information about upstream nodes or downstream nodes and information about use priorities of the upstream nodes or the downstream nodes that are included in the node label in the label stack, for the traffic information of the key node and the traffic information of the relevant nodes.

\* \* \* \* \*